US012160737B2

(12) United States Patent
Luo et al.

(10) Patent No.: US 12,160,737 B2
(45) Date of Patent: Dec. 3, 2024

(54) SECURE FINE TIME MEASUREMENT FOR WIRELESS COMMUNICATION PROTOCOLS (71) Applicant: Cypress Semiconductor Corporation, San Jose, CA (US)

(72) Inventors: Hui Luo, Marlboro, NJ (US); Saishankar Nandagopalan, San Diego, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 373 days.

(21) Appl. No.: 17/127,026

(22) Filed: Dec. 18, 2020

(65) Prior Publication Data
US 2022/0201480 A1 Jun. 23, 2022

(51) Int. Cl.
*H04L 9/40* (2022.01)
*H04L 9/30* (2006.01)
(Continued)

(52) U.S. Cl.
CPC ....... *H04W 12/069* (2021.01); *H04W 12/106* (2021.01); *H04W 76/10* (2018.02);
(Continued)

(58) Field of Classification Search
CPC .. H04W 12/069; H04W 76/10; H04W 12/106
(Continued)

(56) References Cited

U.S. PATENT DOCUMENTS 10,009,430 B2   6/2018 Eyal et al.
10,492,139 B2 * 11/2019 Yang ................. H04W 52/0229
(Continued)

FOREIGN PATENT DOCUMENTS

CN   101442531 A *  5/2009 .......... H04L 63/123
CN   101330427 B * 12/2011 ............. H04L 63/08
(Continued)

OTHER PUBLICATIONS

Berthold Horn, "Doubling the Accuracy of Indoor Positioning: Frequency Diversity", Sensors 2020 Article, Mar. 9, 2020; 21 pages.
(Continued)

*Primary Examiner* — Haresh N Patel (57) ABSTRACT

In general, techniques are described by which to perform secure fine time measurement for wireless communication protocols. An initiating station comprising wireless communication circuitry may be configured to perform the techniques. The wireless communication circuitry may be configured to receive, in accordance with a wireless networking protocol for communicating between the initiating station and a responding station, a first fine time measurement specifying a first time. The wireless communication circuitry may also be configured to receive, in accordance with the wireless networking protocol and for the corresponding first time, a first message integrity code. The wireless communication circuitry may next be configured to authenticate, based on the first message integrity code, the responding station to establish that the fine time measurement is from a trusted responding station.

20 Claims, 5 Drawing Sheets

(51) Int. Cl.
*H04W 12/069* (2021.01)
*H04W 12/106* (2021.01)
*H04W 76/10* (2018.01)
H04W 80/04 (2009.01)
H04W 84/12 (2009.01)
H04W 84/18 (2009.01)

(52) U.S. Cl.
CPC ............ *H04W 80/04* (2013.01); *H04W 84/12* (2013.01); *H04W 84/18* (2013.01)

(58) Field of Classification Search
USPC ........................................................... 726/6
See application file for complete search history.

(56) References Cited

U.S. PATENT DOCUMENTS

| | | | |
|---|---|---|---|
| 10,674,331 B1 | 6/2020 | Huang et al. | |
| 11,350,458 B1* | 5/2022 | Narula | H04W 74/0808 |
| 2016/0226886 A1 | 8/2016 | Steiner | |
| 2016/0270053 A1* | 9/2016 | Zeng | H04W 52/0212 |
| 2017/0257758 A1* | 9/2017 | Aldana | H04W 64/00 |
| 2017/0280392 A1 | 9/2017 | Segev et al. | |
| 2017/0324549 A1 | 11/2017 | Abramovsky et al. | |
| 2018/0049027 A1 | 2/2018 | Abraham et al. | |
| 2018/0091286 A1* | 3/2018 | Prechner | G01S 5/00 |
| 2018/0115424 A1* | 4/2018 | Bhandaru | H04L 9/14 |
| 2019/0050805 A1 | 2/2019 | Munafo et al. | |
| 2019/0075461 A1 | 3/2019 | Sun et al. | |
| 2019/0098493 A1* | 3/2019 | Li | H04L 63/068 |
| 2019/0182365 A1 | 6/2019 | Li et al. | |
| 2019/0182674 A1* | 6/2019 | Li | G01S 13/767 |
| 2021/0099873 A1* | 4/2021 | Windsor | H04L 63/0892 |
| 2021/0364597 A1* | 11/2021 | Sheriff | G01S 13/765 |

FOREIGN PATENT DOCUMENTS

| | | | | |
|---|---|---|---|---|
| CN | 107809759 A | * | 3/2018 | |
| CN | 106934881 B | * | 4/2019 | |
| CN | 106936559 B | * | 1/2020 | ............... G01S 5/00 |
| CN | 107801187 B | * | 2/2021 | ......... H04L 63/0876 |
| CN | 112600820 A | * | 4/2021 | ......... H04L 63/0807 |
| KR | 20210152850 A | * | 12/2021 | |
| WO | WO-2018004764 A2 | * | 1/2018 | ........... G01S 13/765 |
| WO | 2019190519 A1 | | 10/2019 | |
| WO | 2020169505 A1 | | 8/2020 | |
| WO | 2020169629 A1 | | 8/2020 | |

OTHER PUBLICATIONS

"IEEE Std 802.11-2016, Part 11: Wireless LAN Medium Access Control (MAC) and Physical Layer (PHY) Specifications," IEEE Standards Association, Dec. 7, 2016, 3534 pp.

"WiFi Fine Time Measurement (FTM) Round Trip Time (RTT) for Indoor Positioning," https://people.csail.mit.edu/bkph/ftmrtt_intro., Nov. 3, 2020, 2 pp.

Ibrahim et al., "Verification: Accuracy Evaluation of WiFi Fine Time Measurements on an Open Platform," MobiCom '18: Proceedings of the 24th Annual International Conference on Mobile Computing and Networking, Oct. 15, 2018, 11 pp.

* cited by examiner

SECURE FINE TIME MEASUREMENT FOR WIRELESS COMMUNICATION PROTOCOLS

TECHNICAL FIELD

This disclosure relates to wireless communication protocols, and more specifically, techniques for providing secure fine time measurement via the wireless communication protocols.

BACKGROUND

The Internet of Things (IoT) refers to a broad category of technology that enables interactions, via network protocols, between devices, including so-called smart devices such as smart speakers, smart plugs, smart lights, smart televisions, smartphones, smart locks, smart doorbells, etc., as well as other devices, such as keyless entry systems for homes and/or vehicles, cameras, and the like. In some instances, wireless networking protocols that conform to an Institute of Electrical and Electronics Engineers (IEEE) 802.11 standards (which may be referred to as WiFi™) are employed to facilitate wireless interactions between the devices.

In some contexts, determining the proximity of the devices (which may be referred to as an initiating station and a responding station) to one another may be desirable prior to permitting the interactions between the initiating station and the responding station, especially when such interactions permit physical access to an underlying resource, such as a home and/or a vehicle. While wireless networking protocols may provide for accurate distance determination of the responding station relative to the initiating station via a process known as fine time measurement, such fine time measurement processes may be easily compromised via inadvertent or malicious operation of the responding station.

SUMMARY

In general, techniques are described for secure fine time measurement for wireless networking protocols. A responding station may respond to an initiating station, and in doing so, the responding station may not only transmit the fine time measurement, but may also transmit a message integrity code that the initiating station may use to authenticate the fine time measurement as being sent by an authorized responding station. That is, the initiating station may be initially associated with a given responding station, where such association may involve agreement on a shared key that the responding station may use to generate the message integrity code. The initiating station may then authenticate the message integrity code (using the associated shared key) sent by the responding station in order to establish a secure session between the responding station and the initiating station for purposes of performing round trip time fine time measurement (RTT FTM). In this way, the initiating station may determine that the fine time measurement is from a valid initiating station, thereby potentially providing secure fine time measurement for wireless communication protocols.

In some examples, various aspects of the techniques may enable more secure interactions via wireless communication protocols that potentially require accurate proximity detections. While global positioning systems (GPS) and other conventional processes may enable device distance determination, such processes are not as accurate as that provided by way of fine time measurement as described herein. As such, various aspects of the techniques described in this disclosure may enable responding stations and initiating stations to establish a secure session by which FTM may be performed to facilitate instances in which accurate positioning of stations is required prior to permitting access to underlying resources, such as a house and/or a vehicle.

In one example, aspects of the techniques are directed to a method comprising: receiving, in accordance with a wireless networking protocol for communicating between an initiating station and a responding station, a first fine time measurement specifying a first time; receiving, in accordance with the wireless networking protocol and for the corresponding first time, a first message integrity code; and authenticating, based on the first message integrity code, the responding station to establish that the fine time measurement is from a trusted responding station.

In another example, aspects of the techniques are directed to a method comprising: transmitting, in accordance with a wireless networking protocol for communicating between an initiating station and a responding station, a first fine time measurement specifying a first time; transmitting, in accordance with the wireless networking protocol and for the corresponding first time, a first message integrity code; and receiving, responsive to the first message integrity code, an acknowledgement indicating that a secure session has been established between the initiating station and the responding station.

In another example, aspects of the techniques are directed to a system comprising: an initiating station; and a responding station, the responding station comprising: first wireless communication circuitry configured to: transmit, in accordance with a wireless networking protocol for communicating between the initiating station and the responding station, a first fine time measurement specifying a first time; transmit, in accordance with the wireless networking protocol and for the corresponding first time, a first message integrity code; wherein the initiating station comprises: second wireless communication circuitry configured to: receive, in accordance with a wireless networking protocol for communicating between the initiating station and a responding station, the first fine time measurement specifying the first time; receive, in accordance with the wireless networking protocol and for the corresponding first time, the first message integrity code; authenticate, based on the first message integrity code, the responding station to establish a secure session between the initiating station and the responding station; and transmit, in accordance with the wireless networking protocol, an acknowledgement indicating that a secure session has been established between the initiating station and the responding station, wherein the responding station further comprises processing circuitry configured to access, based on receipt of the acknowledgment, a resource associated with the initiating station.

The details of one or more aspects of the techniques are set forth in the accompanying drawings and the description below. Other features, objects, and advantages of these techniques will be apparent from the description and drawings, and from the claims.

DETAILED DESCRIPTION

Wireless networking protocols provide for a process referred to as fine time measurement (FTM). For example, the Institute of Electrical and Electronics Engineers (IEEE) 802.11mc standard defines a round trip time (RTT) FTM to facilitate indoor positioning, which may enable wireless access points (as initiating stations) to better manage delivery of wireless networking services to responding stations (e.g., a smartphone, laptop, portable gaming systems, and/or other portable devices) as the responding stations move between the access points.

That is, wireless access points may initiate RTT FTM (thereby acting as so-called "initiating stations") to identify a position of the responding stations relative to the initiating stations. The initiating stations may then determine the wireless access points to which the responding station should connect in order to receive wireless networking services having the highest signal to noise ratio (or other metric associated with wireless networking services).

While RTT FTM may provide for accurate identification of receiver station position, RTT FTM may be relatively unsecure as there is no need to properly authenticate that the RTT FTM data is valid. In other words, the IEEE 802.11 standard does not provide for securing RTT FTM data used by initiating and responding station.

In some contexts, the accurate identification of receiver station position may be desirable, especially when such position is relevant prior to permitting access to the initiating station (e.g., for remote keyless entry systems in vehicles and/or smart locks for homes or other uses). Positioning processes, such as angle of arrival (AoA) provided by some personal area network (PAN) protocols or global positioning system (GPS), are only accurate up to a couple (e.g., five or more) meters while RTT FTM may be accurate down to one meter.

In accordance with various aspects described in this disclosure, the initiating station may perform secure fine time measurement. A responding station may not only transmit the fine time measurement, but may also transmit a message integrity code that the initiating station may use to authenticate the fine time measurement as being sent by an authorized responding station. That is, the initiating station may be initially associated with a given responding station, where such association may involve agreement on a shared key that the responding station may use to generate the message integrity code. The initiating station may then authenticate the message integrity code sent by the responding station (using the shared shared key) in order to establish a secure session between the responding station and the initiating station for purposes of performing RTT FTM. In this way, the initiating station may determine that the fine time measurement is from a valid responding station, thereby providing secure fine time measurement for wireless networking protocols in contexts requiring secure proximity detection prior to granting access to resources.

In this way, various aspects of the techniques described herein may ensure backwards compatibility allowing stations that do not implement secure RTT FTM to perform unsecure RTT FTM consistent with the wireless networking protocol (e.g., the above noted IEEE 802.11mc or other FTM wireless networking protocol standards). In some examples, the initiating station may specify a burst duration that is longer than a standard burst duration for performing unsecure RTT FTM (e.g., 2-4 times longer than is normally specified for unsecure RTT FTM) in order to permit delivery of one or more message integrity codes in addition to the FTM. A responding station may compare this burst duration to a threshold burst duration and perform secure RTT FTM when the burst duration is longer than the threshold burst duration. However, if the responding station is not configured to implement secure RTT FTM, the responding station may only send FTM specifying the one or more times without providing any message integrity codes consistent with unsecure RTT FTM, thereby permitting backward compatibility with existing unsecure RTT FTM specified in various wireless network protocol standards.

Figure 1:
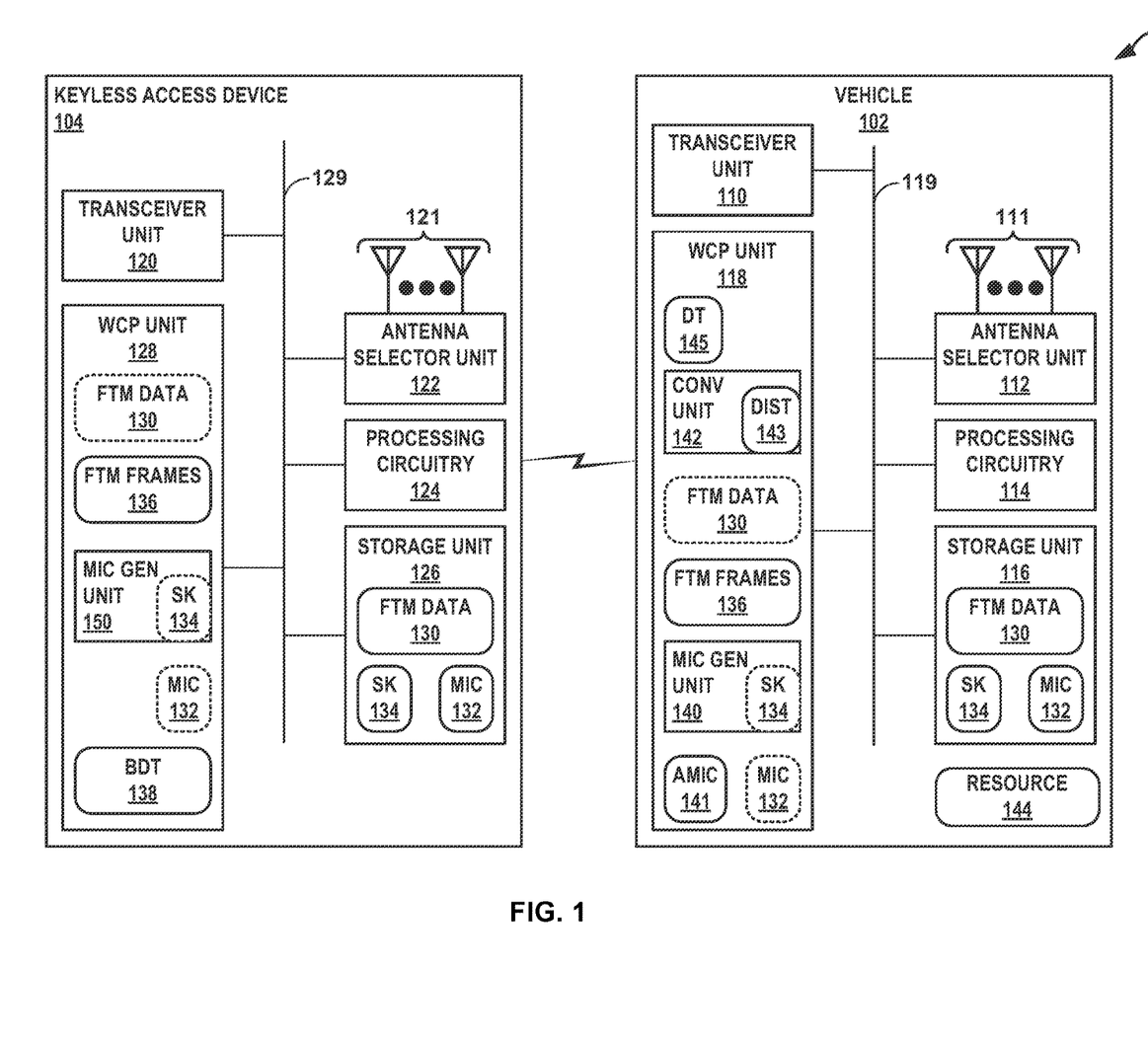
FIG. 1 is a block diagram illustrating an example keyless access system configured to perform secure fine time measurement in accordance with various aspects of the techniques described in this disclosure.

FIG. 1 is a block diagram illustrating an example keyless access system configured to perform secure fine time measurement in accordance with various aspects of the techniques described in this disclosure. As shown in the example of FIG. 1, a system 100 includes a vehicle 102 and a keyless access device 104.

Vehicle 102 may represent any type of vehicle capable of acting as an initiating station for purposes of performing secure fine time measurement (FTM), such as round trip time (RTT) FTM as set forth in IEEE 802.11mc. Vehicle 102 may represent any type of vehicle, including an automobile, a truck, farm equipment, a motorcycle, a bike (including electronic bikes), a scooter, construction equipment, a semi-truck, an airplane, a helicopter, a military vehicle, robot, or any other type of vehicle capable of acting as the initiating station.

Keyless access device 104 may represent any device capable of acting as a responding station for purposes of performing secure FTM, such as RTT FTM as set forth in IEEE 802.1mc. Keyless access device 104 may include a so-called "key fob," a smartphone, a laptop computer, a tablet computer, or any other portable device capable of interfacing with the initiating station, i.e., vehicle 102 in the example of FIG. 1, to perform RTT FTM. Furthermore, keyless access device 104 may allow an occupant of vehicle 102 to gain access to an interior of vehicle 102 (e.g., one or more of a passenger compartment, a glove box or other console compartment, a trunk, or any other compartment or interior of vehicle 102) and potentially operate vehicle 102.

While described with respect to a keyless access system 100, the techniques described in this disclosure may be performed with respect to any system in which secure FTM may be performed in order to potentially more accurately detect a proximity of a responding station to an initiating station in order to permit the responding station to access, control, or otherwise manipulate the initiating station.

For example, various aspects of the techniques may be performed with respect to smartlocks acting as the initiating station with respect to a smartphone acting as a responding station in order to access a house, garage, shed, or other compartment secured by the smartlock.

In some examples, vehicle 102 may, as shown in the example of FIG. 1, include a transceiver unit 110, an antenna selector unit 112, processing circuitry 114, a storage unit 116, a wireless communication protocol (WCP) unit 118, and a bus 119. Transceiver unit 110 may represent a unit configured transmit and receive radio frequency (RF) signals according to one or more communication protocols.

When operating as a receiver, transceiver unit 110 may process received RF signals in the analog domain, perform analog-to-digital signal processing to convert the RF signals into digital signals (or, in other words, digital data), and demodulate the digital data to provide binary data for further processing (e.g., packet processing) by WCP unit 118. When operating as a transmitter, transceiver unit 110 may perform operations reciprocal to those performed when operating as a receiver, receiving digital data from WCP unit 118, performing digital-to-analog signal processing to convert the digital data into analog signals, and outputting the analog signals for transmission by one or more of antennas 111. As such, transceiver unit 110 may include circuitry or a combination of software (firmware, middleware, etc. or any other form of instructions or bytecode) for performing analog-to-digital conversion, and digital-to-analog conversion, modulation, demodulation and other forms of signal processing for sending and receiving RF signals via antennas 111.

Antenna selector unit 112 may represent a hardware unit (e.g., circuitry) configured to select one or more antennas 111 and couple the selected antennas of antennas 111 to transceiver unit 110. In some examples, each of antennas 111 may represent one or more antennas. Antenna selector unit 112 may, in some examples, operate as switch circuitry to couple transceiver unit 110 to one or more antennas 111 (e.g., a phased array and/or antenna clusters—such as six or eight antennas).

Processing circuitry 114 may represent any type of circuitry configured to process data. For example, processing circuitry 114 may represent any combination of one or more of a central processing unit (CPU), a microprocessor, a graphics processing unit, a field programmable gate array (FPGA), an application specific integrated circuit (ASIC), a dedicated integrated circuit, a digital signal processor (DSP), an electronic control unit (ECU, which reside, for example, in vehicles), a control unit (which reside, for example, in networking equipment), general circuitry coupled to a printed circuit board (PCB), analog circuitry, and the like.

In instances in which processing circuitry 114 may represent a CPU, microprocessor or other type of programmable processor that executes instructions, the programmable processor may have a single processing core (which may be referred to as a "core"), or multiple cores that are included in a single package or housing. In some instances, processing circuitry 114 may include multiple different processors (e.g., a GPU, a CPU, one or more sensors, video and/or audio processors—for compression, rendering, etc., memory, and the like) that reside in a single so-called system-on-a-chip. In some instances, processing circuitry 114 may be a dedicate integrated circuit that implements a programmable processor along with each of transceiver unit 110, antennas 111, antenna selector unit 112, storage unit 116, and WCP unit 118.

Storage unit 116 may represent a non-transitory computer-readable storage media configured to store instructions (although not shown in the example of FIG. 1 for ease of illustration purposes) that, when executed, cause processing circuitry 114 to perform operations attributed to processing circuitry 114 throughout this disclosure. Storage unit 116 may include any combination of volatile memory and non-volatile memory. Volatile memory may include dynamic random access memory (DRAM) and/or static RAM (SRAM), while non-volatile memory may include read only memory (ROM, such as erasable programmable ROM—EPROM, electrically EPROM—EEPROM, Flash memory), non-volatile RAM (NVRAM), hard disk drives, solid state drives, optical discs, and the like.

WCP unit 118 may represent one or more elements configured to implement one or more wireless communication protocols. WCP unit 118 may be implemented as wireless communication circuitry that performs operations attributed throughout this disclosure to WCP unit 118. In any event, WCP unit 118 may implement wireless communication protocols, including a wireless networking protocol, such as one or more versions of WiFi™ defined in a suite of standards generally denoted as IEEE 802.11 standards, for establishing a wireless local area network (WLAN) connection between a wireless access point and a computing device. Wireless communication protocols may also include wireless personal area network (WPAN) protocols, such as the IEEE 802.15 suite of standards (which define to some extent operation of Bluetooth®), for establishing WPAN connections directly between two computing devices.

That is, wireless networking protocols operate according to a network stack having multiple layers. The layers of any given implementation of a wireless network protocol may include all of or some subset of the layers defined by the Open Systems Interconnect (OSI) model, which includes a physical layer, a data link layer (e.g., Ethernet), a network layer (e.g., Internet protocol—IP), a transport layer (e.g., a transport control protocol—TCP), a session layer, a presentation layer, and an application layer (e.g., hyper-text transfer protocol—HTTP).

WPAN protocols do not generally implement a network stack, but instead provide for a short, direct connection in which a host device (which may also be referred to as a source device) may manage WPAN connections between one or more client devices (which may also be referred to as a sink device). WPAN connections provide for proximate (meaning such connections are generally short range, e.g., 10 meters), low data communication between the host device and the one or more client devices. WPAN connections may access network connections (including wireless network connections) in which one of the devices participating in the WPAN connection acts as a gateway to facilitate forwarding of communications via wireless networking protocols to the LAN and/or WLAN.

In this respect, WLAN protocols are separate and distinct from WPAN protocols, although WLAN protocols may share some resources in common with WPAN protocols, such as RF spectrum. As such, when referring to wireless networking protocols, including WLAN protocols, WPAN protocols (and PAN protocols generally) should be understood to be excluded, in some examples, from wireless network protocols. Although described as being separate, WPAN protocol may, in other examples, be included within WLAN protocols, and the techniques described in this disclosure may apply to both WLAN protocols and WPAN protocols, and more generally to any wireless communication protocols, such as protocols defined in accordance with WiFi™ standards, Bluetooth® standards, Zigbee standards (as defined in IEEE 802.15.4 specifications or, in other words, standards), etc.

Bus 119 may represent a communication medium that interconnects one or more, and possibly all (as shown in the example of FIG. 1), of transceiver unit 110, antenna selector unit 112, processing circuitry 114, storage unit 116, and WCP unit 118 to one or more, and possibly each, every one of units 110-118. Bus 119 may include inter-chip busses, intra-chip busses, coexistence busses, or any other communication lines that connect the circuits and/or logic represented by units 110-118, which may be disposed within an integrated circuit chip or discrete integrated circuit chip.

As further shown in the example of FIG. 1, keyless access device 104 may include a transceiver unit 120, an antenna selector unit 122, processing circuitry 124, a storage unit 126, a WCP unit 128, and a bus 129. Each of units 120-128 may be similar to, if not substantially the same as, units 110-118 described above with respect to vehicle 102. Moreover, keyless access device 104 may include antennas 121, which may be similar, if not substantially similar, to antennas 111. Bus 129 may also be similar, if not substantially similar, to bus 119.

As noted above, wireless networking protocols provide for a process referred to as fine time measurement (FTM). For example, the IEEE 802.11mc standard defines a round trip time (RTT) FTM to facilitate indoor positioning, which may enable wireless access points (as initiating stations) to better manage delivery of wireless networking services to responding stations (e.g., a smartphone, laptop, portable gaming systems, and/or other portable devices) as the responding stations move between the access points.

In some examples, wireless access points may initiate RTT FTM (thereby acting as so-called "initiating stations") to identify a distance (and possibly position) of the responding stations from (or in the case of position, relative) to the initiating stations. The initiating stations may then determine which of the wireless access points to which the responding station should connect in order to receive wireless networking services having the highest signal to noise ratio (or other metric associated with wireless networking services).

While 802.11 RTT FTM may provide for accurate identification of receiver station distance from the initiating station, RTT FTM may be relatively unsecure as there is no authentication ensuring that the RTT FTM data is valid. As such, RTT FTM data is sent in the clear without any encryption or other authentication data.

In some contexts, such as keyless access system 100, the accurate identification of receiver station distance from the initiating station may be important especially when such distance is relevant prior to permitting access to the initiating station (e.g., for remote keyless entry systems in vehicles and/or smart locks for homes or other usesPositioning processes, such as angle of arrival (AoA) provided by some personal area network (PAN) protocols or a global positioning system (GPS), are only accurate up to a couple (e.g., five or more) meters while RTT FTM may be accurate down to one meter.

Consider example keyless access system 100 shown in the example of FIG. 1 in which vehicle 102 may act as the initiating station (and, as such, may be referred to as initiating station 102) while keyless access device 104 may act as the responding station (and, as such, may be referred to as responding station 104). Vehicle 102 may determine a distance between vehicle 102 and keyless access device 104 so as to only enable access to vehicle 102 when the distance between keyless access device 104 and vehicle 102 is below a threshold distance. Such distance between vehicle 102 and keyless access device 104 may be a criterion for enabling access to vehicle 102 for safety and/or security reasons.

For example, allowing keyless access device 104 to access vehicle 102 to open a door may result in a door being opened that harms a person, an adjacent vehicle, a shopping cart, a pet, or other individual, animal or property that is not visible or noticeable from relatively larger distances (e.g., above the threshold distance). As another example, allowing keyless access device 104 to access vehicle 102 to unlock or open a door may result in unauthorized entry of persons that may steal or otherwise harm personal property stored in vehicle (or harm the interior of vehicle itself).

Furthermore, large inaccuracies in determining the distance between keyless access device 104 and vehicle 102 may result in allowing keyless access device 104 to access vehicle 102 when such access should have been denied. That is, having an error on the order of several meters when computing the distance between vehicle 102 and keyless access device 104 may enable access in instances for which access should have been denied (due to the actual distance being greater than that determined).

In accordance with various aspects described in this disclosure, initiating station 102 may perform secure fine time measurement. Responding station 104 may not only transmit the fine time measurement (FTM) data 130, but may also transmit a message integrity code (MIC) 132 that initiating station 102 may use to authenticate keyless access device 104 as sending secure FTM data 130. That is, initiating station 102 may be initially associated with a given responding station, i.e., responding station 104 in the example of FIG. 1, where such association may involve agreement on a shared key (SK) 134 that responding station 104 may use to generate MIC 132. Examples of shared key 134 include a group temporal key (GTK), a unicast key (e.g., a pairwise transit key—PTK), and the like.

Initiating station 102 may then authenticate MIC 132 sent by responding station 104 (using shared SK 134) in order to establish a secure session between responding station 10 and initiating station 102 for purposes of performing RTT FTM. In this way, initiating station 102 may determine that FTM data 130 is from a valid responding station, thereby potentially providing secure FTM for wireless networking protocols in contexts requiring secure proximity detection prior to granting access to resources (e.g., vehicle 102).

In operation, initiating station 102 may initially specify, in a first frame of FTM frames 136, a request for RTT FTM that includes a burst duration (that is above a threshold burst duration in order to signal that FTM is to be authenticated via MIC 132 (or, in other words, that secure FTM is to be performed). Although described with respect to the burst duration being above the threshold burst duration in order to signal that secure FTM is to be performed, initiating station 102 may specify, as an alternative to, or in conjunction with, the burst duration being above the threshold burst duration, an indication that secure FTM is to performed in which FTM data 130 is to be authenticated via MIC 132.

In either event, initiating station 102 may provide the first frame of FTM frames 136 to transceiver unit 110, which may transmit the first frame via antennas 111 (or some subset of antennas 111 selected by antenna selector unit 112). It should be noted that the term "frame" refers to an Ethernet frame consistent with layer two communications via layer two of the foregoing network stack, where WCP unit 118 may generate the first frame (and for that matter, all of FTM frames 136) in accordance with the IEEE 802.11mc standard defining RTT FTM for the Ethernet protocol (and possibly other layer two networking protocols).

In any event, responding station 104 may receive the first frame of FTM frames 136 requesting RTT FTM and specifying the burst duration that is above the threshold burst duration. Responding station 104 may receive the first frame as an RF signal via antenna 121 (or some subset of antennas 121 selected by antenna selector unit 122). More specifically, transceiver 120 may receive the first frame of FTM frames 136, converting as noted above, the first frame into a digital representation of the first frame of FTM frames 136. Transceiver unit 120 may pass the first frame of FTM frames 136 to WCP unit 128, which may process the first frame to parse the burst duration from the first frame.

WCP unit 128 may compare the burst duration specified in the first frame to the burst duration threshold (BDT) 138 in order to determine whether to perform secure FTM. Assuming for purposes of illustration that the parsed burst duration is greater than BDT 138, WCP unit 128 may determine that secure FTM is to be performed. As such, WCP unit 128 may access storage unit 126 to obtain SK 134, and determine, based on SK 134, MIC 132.

WCP unit 128 may also determine FTM data 130, which may include a first indication of a fine time measurement specifying a first time (and possibly a second time). That is, FTM data 130 may specify a time a subsequent frame of FTM frames 136 specifying FTM data 130 from responding station 104 was sent by responding station 104 and a time the subsequent frame of FTM frames 136 specifying FTM data 130 from initiating station 102 was received. However, considering the first frame of FTM frames 136 only specifies a request for FTM and did not include any FTM data 130, and that this is the first frame of FTM frames 136 that includes FTM data 130, WCP unit 128 may specify FTM data 130 as null for both times. In any event, WCP unit 128 may transmit FTM data 130 to WCP unit 118 in this manner for one or more additional iterations, as will be described in greater detail with respect to the example of FIG. 2.

In some examples, WCP unit 118 may receive, in accordance with a wireless networking protocol for communicating between initiating station 102 and responding station 104, FTM data 130 specifying at least a first time (e.g., a time a subsequent frame of FTM frames 136 specifying FTM data 130 from responding station 104 was sent by responding station 104 and a time the subsequent frame of FTM frames 136 specifying FTM data 130 from initiating station 102 was received). After the iterations of providing FTM frames 136 specifying FTM data 130 has concluded, WCP unit 128 may generate one or more FTM frames 136 that specify MIC 132 generated using SK 134.

As further shown in the example of FIG. 1, WCP unit 128 may include a MIC generation (GEN) unit 150 configured to generate, based on SK 134, MIC 132. As discussed above, WCP unit 128 may initially execute a WPAN or other wireless communication protocol to establish an association with initiating station 102. In some examples, WCP unit 128 may execute the WPAN to detect, prior to establishing communication via the wireless network protocol, initiating station 102 (or vice versa, where initiating station 102 may execute WPAN to detect responding station 104). WCP unit 128 may utilize WPAN protocols to detect initiating station 102 as the WPAN protocol may utilize less energy or otherwise consume less processing or other computing resources of responding station 104 (which may operate via a battery or other portable power source that has a limited duration compared to wired power sources). WCP unit 128 may then enable, responsive to detecting initiating station 102 via the WPAN, the communication via the wireless network protocol between initiating station 102 and responding station 104.

In any event, WCP unit 128 may initially execute the WPAN to establish a WPAN connection (or in other words, session) with initiating station 102 to exchange SK 134. SK 134 may represent a key by which to generate MIC 132 that is specific to the wireless networking session to be established between responding station 104 and initiating station 102. MIC generation unit 150 may then utilize SK 134 to generate MIC 132, or in other words, generate, based on SK 134, MIC 132. WCP unit 128 may then generate FTM frames 136 to include MIC 132 (where FTM frames 136 may include a MIC frame formatted in accordance with the wireless networking protocol in which the FTM frame 136 wraps the MIC frame or portions thereof as described in more detail below). WCP unit 128 may next transmit the FTM frames 136 to initiating station 102.

Initiating station 102 may, as a result, receive, in accordance with the wireless networking protocol and for the corresponding first time, the authentication frames specifying MIC 132. Initiating station 102 may associate any given MIC 132 to each of the subsequent frames of the FTM frames 136 specifying FTM data 130 based on a time specified in the authentication frames of FTM frames 136. That is, WCP unit 128 may generate each authentication frame to include a time at which each of the corresponding FTM frames 136 was sent, thereby allowing WCP unit 118 to determine to which of FTM frames 136 each authentication frame corresponds in order to authenticate responding station 104 as a valid responding station.

WCP unit 118 may thereby authenticate, based on MIC 132, responding station 104 to establish a secure session between initiating station 102 and responding station 104 and thereby establish that FTM data 130 is from a trusted (or valid) responding station. To authenticate responding station 104 based on MIC 132, initiating station 102 may apply SK 134 to some base value (e.g., a time at which WCP unit 128 received the subsequent frame specifying FTM data 130, FTM data 130, etc.) in order to reconstruct a comparison MIC (which is shown in the example of FIG. 1 as authentication MAC—AMAC—141). WCP unit 118 may include a MIC generation (GEN) unit 140 configured to generate, based on SK 134, AMIC 141. Initiating station 102 may then compare the AMAC 141 to MIC 132 specified in the corresponding frame of FTM frames 136.

When AMIC 141 is different from MIC 132, initiating station 102 may determine that responding station 104 is not a valid or, in other words, authorized (or, in other words, trusted or valid) responding station and may revoke access to vehicle 102. When AMIC 141 is the same as MIC 132, initiating station 102 may determine that responding station 104 is a trusted or, in other words, authorized responding station, and may permit responding station 104 to access initiating station 102. Initiating station 102 may, in other words, permit, based on successful authentication of responding station 104, responding station 104 to access a resource 144 associated with initiating station 102 (e.g., where resource 144 may represent a lock or other resources associated with a door, trunk or other compartment, etc. or generally operation of vehicle 102).

In some instances, initiating station 102 may not permit access to resource 144 even after authenticating responding station 104 when responding station 104 is not within a set distance threshold (DT) 145. WCP unit 118 may include, as further shown in the example of FIG. 1, a conversion (CONV) unit 142 configured to convert FTM data 130 into one or more distances (DIST) 143 according to the IEEE 802.11mc standard. Conversion unit 142 may determine, based on FTM data 130 (e.g., one or more FTMs representative of times), distance 143. WCP unit 118 may next compare distance 143 to distance threshold 145. When distance 143 is greater than distance threshold 145, WCP unit 118 may not permit responding station 104 to access resource 144 associated with initiating station 102. When distance 143 is less than or equal to distance threshold 145, WCP unit 118 may permit responding station 104 to access resource 144 associated with initiating station 102.

In this respect, WCP unit 128 normally has WiFi™ interfaces turned off, and periodically turns on the Bluetooth® low energy (BLE) interface to detect if any initiating stations, such as initiating station 102, (to which WCP unit 128 has been previously associated) is close to initiating station 102 (or the underlying resource 144). WCP unit 128 may operate in this manner to preserve battery power as the WiFi™ interface may consume more power than BLE. When BLE interfaces of WCP unit 128 detects BLE interface of WCP unit 118, WCP units 118 and 128 may enable respective WiFi™ interfaces for quick distance measurement using the secure FTM techniques described in this disclosure to verify that responding device 104 is in close range (within distance threshold 145) to resource 144.

In some examples, various aspects of the techniques may enable more secure interactions via wireless communication protocols that potentially require accurate proximity detection. While personal area networks (PAN) or global positioning systems (GPS) may provide distance determination of devices, such distance determination of devices provided by PANs or GPS is not as accurate as that provided by way of FTM in accordance with wireless networking protocols. As such, various aspects of the techniques described in this disclosure may enable responding station 104 and initiating station 102 to establish a secure session by which FTM may be performed to facilitate instances in which accurate positioning of stations is required prior to permitting access to underlying resources, such as a house and/or a vehicle 102.

Furthermore, various aspects of the techniques described herein may ensure backwards compatibility allowing stations that do not implement secure RTT FTM to perform unsecure RTT FTM consistent with the wireless networking protocol (e.g., the above noted IEEE 802.11mc or other FTM wireless networking protocol standards). That is, initiating station 102 may specify a burst duration that is longer than a standard burst association for performing unsecure RTT FTM (e.g., 2-4 times longer than is normally specified for unsecure RTT FTM) in order to permit delivery of one or more MICs 132 in addition to the FTM data 130 specifying one or more times. Responding station 104 may compare this burst duration to BDT 138 and perform secure RTT FTM when the burst duration is longer than BDT 138. However, if responding station 104 is not be configured to implement secure RTT FTM, responding station 104 may only send FTM data 130 specifying the one or more times without providing any MIC 132 consistent with unsecure RTT FTM, thereby permitting backward compatibility with existing unsecure RTT FTM specified in various wireless network protocol standards.

Figure 2:
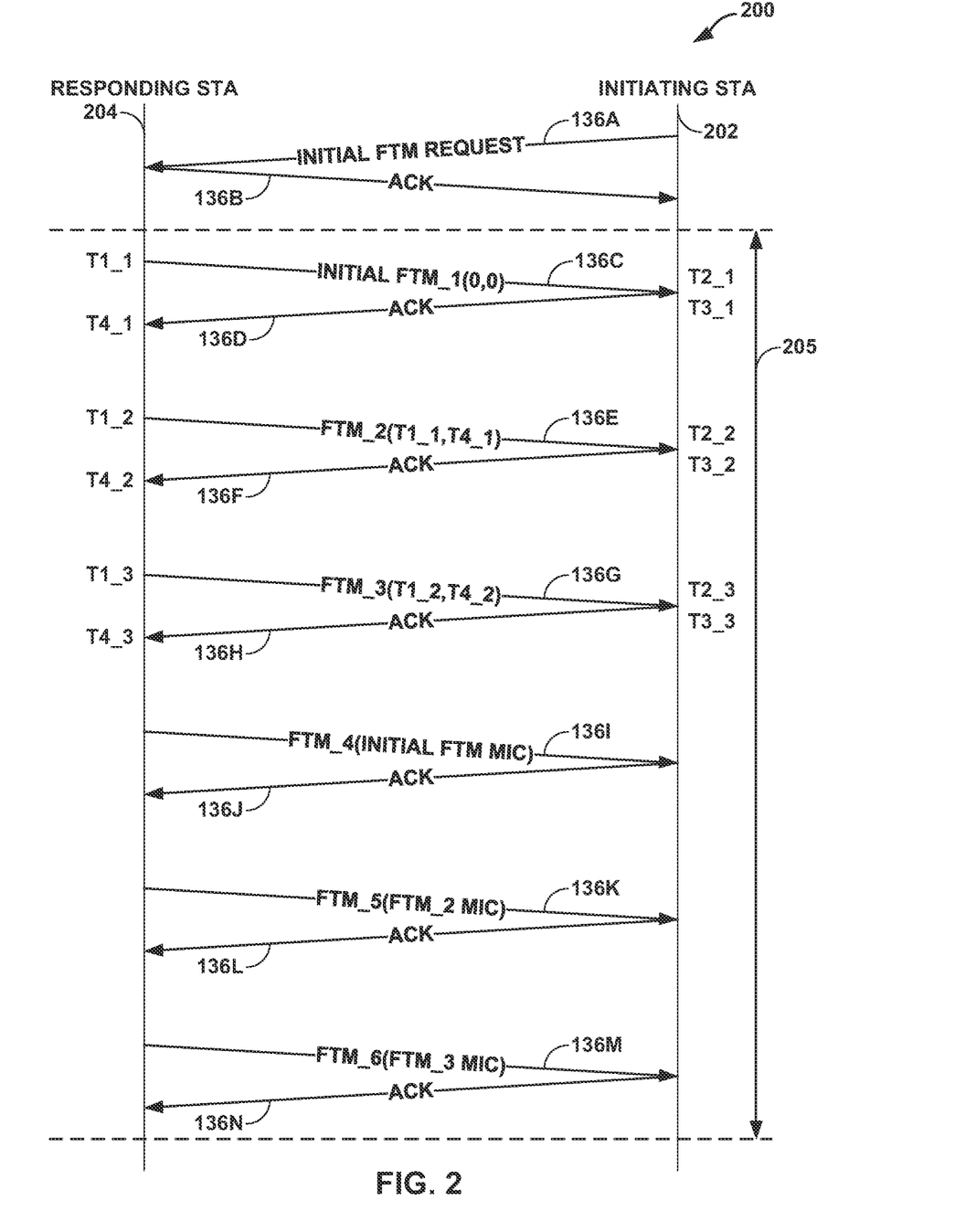
FIG. 2 is a timing diagram illustrating example negotiation and frame exchange sequence between an initiating station and a responding station when performing various aspects of the secure fine time measurement techniques described in this disclosure.

FIG. 2 is a timing diagram illustrating example negotiation and frame exchange sequence between an initiating station and a responding station when performing various aspects of the secure fine time measurement techniques described in this disclosure. As shown in the example of FIG. 2, secure FTM system 200 may include an initiating station 202 and a responding station 204. Vehicle 102 of FIG. 1 may represent an example of initiating station 202, while keyless access device 104 may represent an example of responding station 204.

In any event, initiating station 202 may initially generate frame 136A in accordance with the wireless networking protocol that requests FTM ("initial FTM request" frame 136A). Frame 130A may also specify a burst duration 205 capable of accommodating multiple times (e.g., 3 to 4 times) the duration needed for FTM measurement frames per burst to allow responding station 204 to send back FTM frames specifying FTM data 130 (or, in other words, times) followed by FTM frames specifying corresponding MICs 132. Responding station 204 may receive frame 136A and generate an FTM frame 136B specifying acknowledgement of frame 136A ("ACK" frame 136B).

Responding station 204 may next generate an initial FTM frame 136C ("initial FTM_1(0,0)" frame 136C) specifying FTM data 130, which may include a time of departure of a subsequently sent FTM frame and a time of arrival of an ACK frame acknowledging the subsequently sent FTM frame. As frame 136C is the initial FTM frame, responding station 204 determines that there is no subsequent FTM frame specifying FTM data 130, and sets the time of departure of the subsequently sent FTM frame to zero ("0") and the time of arrival of the ACK frame acknowledging the subsequently sent FTM frame to zero ("0"). Initiating station 202 may receive frame 136C and generate an FTM frame 136D specifying acknowledgement of frame 136D ("ACK" frame 136D).

Responding station 204 may next generate an FTM frame 136E ("FTM_2(T1_1,T4_1)" frame 136E) specifying FTM data 130, which may include a time of departure of subsequently sent FTM frame 136C specifying FTM data 130 (which is shown as "T1_1" in the example of FIG. 2) and a time of arrival of ACK frame 136D acknowledging subsequently sent FTM frame 136C (which is shown as "T4_1" in the example of FIG. 2). That is, the notation on the left and right sides along the lines denoted "responding STA 204" and "initiating STA 202" indicate the time of departure (TOD) for packets sent by responding station 204 and initiating station 202 and a time of arrival (TOA) for packets received by responding station 204 and initiating station 202. In any event, responding station 204 sends FTM frame 136E to initiating station 202, which may receive frame 136E and generate an FTM frame 136F specifying acknowledgement of frame 136F ("ACK" frame 136F).

Responding station 204 may next generate an FTM frame 136G ("FTM_3(T1_2,T4_2)" frame 136G) specifying FTM data 130, which may include a time of departure of subsequently sent FTM frame 136E specifying FTM data 130 (which is shown as "T1_w" in the example of FIG. 2) and a time of arrival of ACK frame 136F acknowledging subsequently sent FTM frame 136E (which is shown as "T4_2" in the example of FIG. 2). Responding station 204 sends FTM frame 136G to initiating station 202, which may receive frame 136G and generate an FTM frame 136H specifying acknowledgement of frame 136G ("ACK" frame 136H).

Up to this point in the exchange of FTM frames 136A-136H, responding station 204 may have operated in accordance with unsecure FTM as set forth by the wireless networking protocol, while initiating station 202 may have only differed from unsecure FTM by way of specifying burst duration 205 that is multiple times the duration necessary to accommodate unsecure FTM. In this respect, secure FTM is backwards compatible and standard compliant with unsecure FTM as set forth by the wireless networking protocol.

If responding station 204 implements secure FTM in accordance with various aspects of the techniques described herein, responding station 204 may, upon receiving initial FTM frame 136A specifying burst duration 205, parse an indication of burst duration 205 from initial FTM frame 136A and compare burst duration 205 to BDT 138. As noted above, when burst duration 205 is less than BDT 138, responding station 204 implements the foregoing exchange to perform unsecure FTM. However, when burst duration 205 is greater than BDT 138, responding station 204 implements secure FTM.

In some examples, to implement secure FTM, responding station 204 generates MIC 132 for each of FTM frames 136C, 136E, and 136G using SK 134. Responding station 204 and initiating station 202 may exchange SK 134 in the most recent successful associating between initiating station 202 and responding station 204. Both of stations 202 and 204 store SK 134 for the most recent associations with all other stations in storage unit 126, where each SK 134 for each association is identified by the media access control (MAC) address for the other station.

For example, responding station 204 may parse a MAC address associated with initiating station 202 from a frame header on initial FTM request frame 136A. Using the MAC address associated with initiating station 202, responding station 204 may perform a lookup in a table storing GTKs, accessing SK 134 identified by the MAC address associated with initiating station 202. Using the lookup table (or other data structure) may avoid responding station 204 and initiating station 202 from having to perform an association each time responding station 204 attempts to access initiating station 202 (which may conserve computing resources and avoid unnecessary operations that would otherwise consume processing cycles, memory, bus bandwidth and associated power or other computing resources).

Responding station 204 may generate FTM frame 136I that includes MIC 132 ("FTM_4(initial FTM MIC)" frame 136I). Responding station 204 may indicate that MIC 132 corresponds to initial FTM frame 136C by specifying, in FTM frame 136I, a TOD equal to the TOD for initial FTM frame 136C (which in this example is denoted as "0"). Responding station 204 may transmit FTM frame 136I to initiating station 202, which may parse the TOD and MIC 132 from FTM frame 136I.

Initiating station 202 may then access FTM data 130 associated with FTM frame 136C (stored to storage unit 116) to identify which FTM data 130 is being authenticated. Initiating station 202 may generate a comparison MIC (or, in other words, an authentication MIC) using SK 134 and compare the authentication MIC to MIC 132 parsed from frame 136I. If the authentication MIC matches MIC 132, initiating station 202 may authenticate FTM data 130 provided by FTM frame 136C as coming from a valid responding station. If the authentication MIC does not match MIC 132, initiating station 202 may not authenticate FTM data 130 as coming from a valid responding station (possibly removing FTM data 130 associated with responding station 204 from storage unit 116).

Responding station 204 and initiating station 202 may continue in this manner with responding station 204 generating and transmitting FTM frames 136K and 136M having MIC 132 associated with FTM frames 136E and 136G respectively by way of TOD specified in FTM frames 136K and 136M of "T1_1" and "T1_2." In each instance, initiating station 202 may respond to receipt of FTM frames 136I, 136K, and 136M with ACK FTM frames 136J, 136L, and 136N, while also authenticating FTM data 130 associated with each of the identified FTM frames 136E, 136G as being generated by a valid responding station.

After authenticating all of the FTM data 130 using MIC 132, initiating station 202 may convert FTM data 130 into an approximate distance from initiating station 202 to responding station 204 using standard unsecured FTM distance conversion processes set forth in the wireless networking protocol. As noted above, when this distance is below a distance threshold, initiating station 202 may permit responding station 204 to access initiating station 202. In this respect, initiating station 202 may permit, based on successful authentication of MIC 132 for FTM frames 130 received from responding station 204, responding station to access initiating station 202.

Figure 3A:
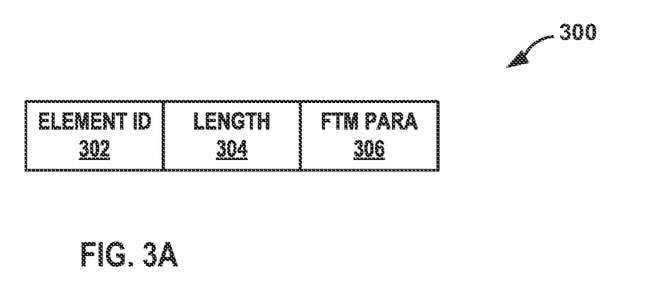
FIGS. 3A and 3B are conceptual diagrams showing examples of fine time measurement frames that stations shown in the example of FIGS. 1 and 2 may generate in order to perform various aspects of the secure fine time measurement techniques.
Figure 3B:
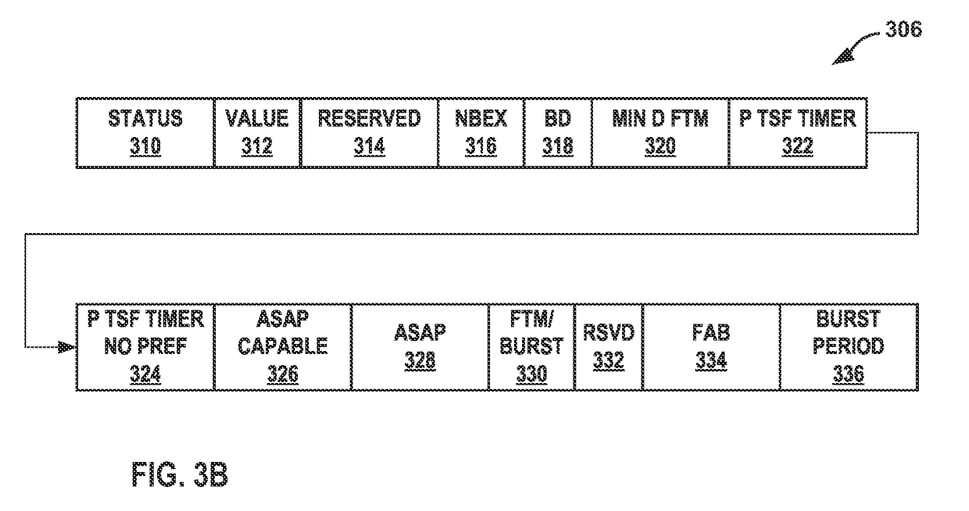

FIGS. 3A and 3B are conceptual diagrams showing examples of fine time measurement frames that stations shown in the example of FIGS. 1 and 2 may generate in order to perform various aspects of the secure fine time measurement techniques. Referring first to the example of FIG. 3A, FTM frame 300 may conform to the wireless networking protocol specified by the IEEE 802.11mc standard, and may represent an example of FTM frames 136. FTM frame 300 may have a general form in which an element identifier (ID) 302 identifies a type of frame, followed by a length 304 that identifies a length of the following field, which in this instance is an FTM parameters field 306. Initiating station 202 may specify element ID 302 to indicate that FTM parameters are defined in FTM parameters field 306 (e.g., set element ID 302 to a value of 206 as set forth in the above noted IEEE 802.11mc standard).

Referring next to the example of FIG. 3B, FTM parameters field 306 is shown in more detail. FTM parameters field 306 may include a status field 310, a value field 312, a reserved field 314, a number of burst exponent (NBEX) field 316, a burst duration (BD) field 318, a minimum delta FTM ("MIN D FTM 320"), a partial timing synchronization function (TSF) timer field 322 ("P TSF TIMER 322"), a partial TSF timer number preference field 324 ("P TSF TIMER NO PREF 324"), an as-soon-as-possible (ASAP) capable field 326, an ASAP field 328, an FTM per burst field 330 ("FTM/BURST 330"), a reserved (RSVP) field 332, a format and bandwidth (FAB) field 334, and a burst period field 336.

For purposes of explaining secured FTM, a full explanation of each of fields 310-336 is not provided in this disclosure. Instead, each of these fields 310-336 are defined in more detail in section 9.4.2.168 of the IEEE standard 802.11-2016 entitled "Part 11: Wireless LAN Medium Access Control (MAC) and Physical Layer (PHY) Specifications," prepared by the 802.11 Working Group of the LAN/MAN Standards Committee of the IEEE Computer Society, and approved Dec. 7, 2016 (hereinafter referred to as the "IEEE standard 802.11-2016").

To the extent FTM parameters 306 related to secured FTM, initiating station 202 may, when negotiating an FTM session, include FTM parameters 306 in initial FTM request frame 136A. Initiating station 202 may specify burst duration 205 in burst duration field 318, setting burst duration 205 to multiple times the duration that normally accommodates the specified number of FTMs per burst set forth in FTM per burst field 330. In this way, initiating station 202 may signal to responding station 204 that responding station 204 should perform secure FTM by sending FTM frames 136C, 136E, and 136G specifying FTM data 130 followed by FTM frames 136I, 136K, and 136N specifying MIC 132.

Figure 4A:
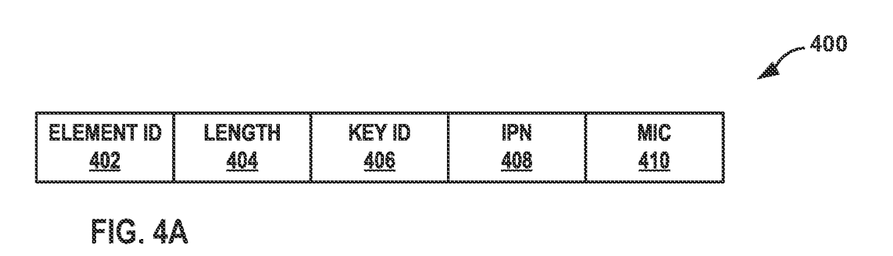
FIGS. 4A and 4B are conceptual diagrams showing additional examples of fine time measurement frames that stations shown in the example of FIGS. 1 and 2 may generate in order to perform various aspects of the secure fine time measurement techniques.
Figure 4B:
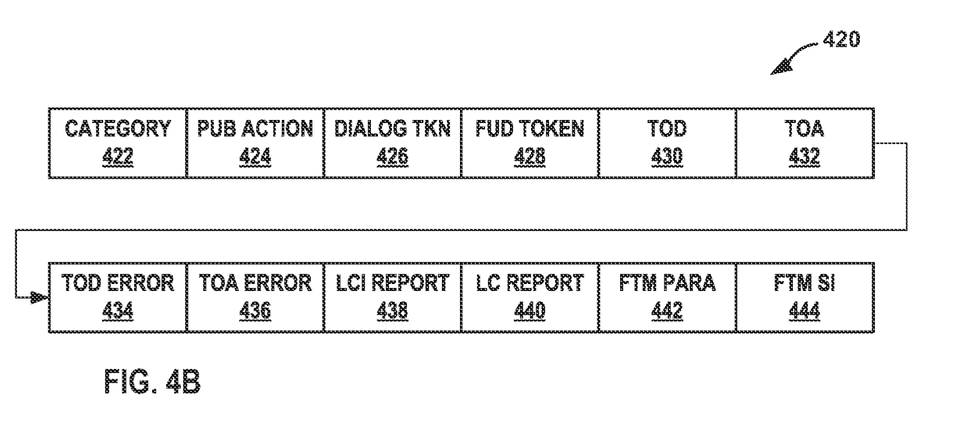

FIGS. 4A and 4B are conceptual diagrams showing additional examples of fine time measurement frames that stations shown in the example of FIGS. 1 and 2 may generate in order to perform various aspects of the secure fine time measurement techniques. Referring first to the example of FIG. 4A, MIC frame 400 may conform to the wireless networking protocol specified by the IEEE 802.11mc standard. MIC frame 400 may have a general form in which an element identifier (ID) 402 identifies a type of frame (which is set to a value of 76 to signal this is a management MIC frame), followed by a length 404 that identifies a length of the following fields, which in this instance is a key ID field 406, an integrity shared key packet number (IPN) field 408, and a MIC field 410. Again, each of these fields are defined in more detail in the IEEE 802.11-2016 standard.

MIC frame 400 may represent a management MIC frame used during normal operation of the wireless networking protocol (e.g., during normal frame delivery to ensure message integrity and prevent forgery and replay). That is, MIC frame 400 may protect data frames unassociated with FTM processes, as the IEEE 802.11-2016 standard does not provide for MIC frames 400 for FTM frames 136. MIC frame 400 may be of variable length as MIC field 410 may be 8 octets or 16 octets long depending on the extent of authentication required (with longer MICs being more difficult to spoof or otherwise crack). The total length of MIC frame 400 may be between 18-26 octets. In order to insert MIC frame 400 into FTM frames 136, responding station 204 may adapt FTM frames 136 to carry MIC frame 400 (either in its entirety or as one or more portions in successive FTM frames).

Referring next to the example of FIG. 4B, an example FTM frame 420 is shown that conforms to the wireless networking protocol specified by the IEEE 802.11mc standard, and may represent an example of FTM frames 136, such as FTM frames 136C, 136E, and 136G that specify FTM data 130. FTM frame 420 includes a category field 422, a public ("PUB") action field 424, a dialog token ("TKN") field 428, a TOD field 430, a TOA field 432, a TOD error field 434, a TOA error field 436, a location configuration information (LCI) report field 438, a location civic (LC) report field 440, an FTM parameters field 442, and a FTM synchronization information (SI) field 444. Again, each of these fields are defined in more detail in the IEEE 802.11-2016 standard.

Responding station 204 may generate FTM frame 420 and may specify the TOD, in TOD field 430, for the subsequent FTM frame 136 specifying FTM data 130 sent by responding station 204 and a TOA, in TOA field 432, for an ACK FTM frame 136 sent in response to the subsequent FTM frame 136 specifying FTM data 130 received by responding station 204. However, to maintain backwards compatibility, responding station 204 may repurpose FTM frame 420 to specify portions of MIC frame 400, and thereby provide secure FTM.

To repurpose FTM frame 420, responding station 204 may replace TOA field 432, TOD error field 434, and TOA error field 436 with a portion of MIC frame 400. As such, responding station 204 may sent multiple FTM frames 420 having different portions of MIC frame 400 in order to specify MIC frame 400 across multiple FTM frames 420.

To illustrate, consider that responding station 204 may generate MIC 132 using a short management element (e.g., for broadcast integrity protocol-cipher-based message authentication code-128 bit—BIP-CMAC-128). Using this short management element, responding station 204 may generate MIC frame 420 having 18 octets. Responding station 204 may specify the first 10 octets in the 10 octets represented by TOA field 432, TOD error field 434, and TOA error field 436 of a first FTM frame 420. Responding station 204 may next specify the remaining 8 octets in the 10 octets represented by TOA field 432, TOD error field 434, and TOA error field 436 of a second FTM frame 420 (which may be padded to 10 octets to avoid parsing errors). In this respect, initiating station 202 may specify a burst duration of three times the normal burst duration for unsecured FTM as three FTM frames 136 are sent to authenticate each FTM frame 136 specifying FTM data 130.

When responding station 204 uses a larger management element in which MIC 132 is an additional 8 octets (such as when using BIP-CMAC-256), responding station 204 generates three FTM frames 420 to specify the longer MIC frame 400 (as both the first and second FTM frames 420 specify a full 10 octets and the third FTM frame 420 is required to send the remaining 6 octets—which may be padded to 10 octets to avoid potential parsing errors). In this instance, initiating station 202 may specify a burst duration that is four times the normal burst duration for unsecured FTM, as three additional FTM frames 420 are required to authenticate FTM frames 420 specifying MIC frames 400.

Figure 5:
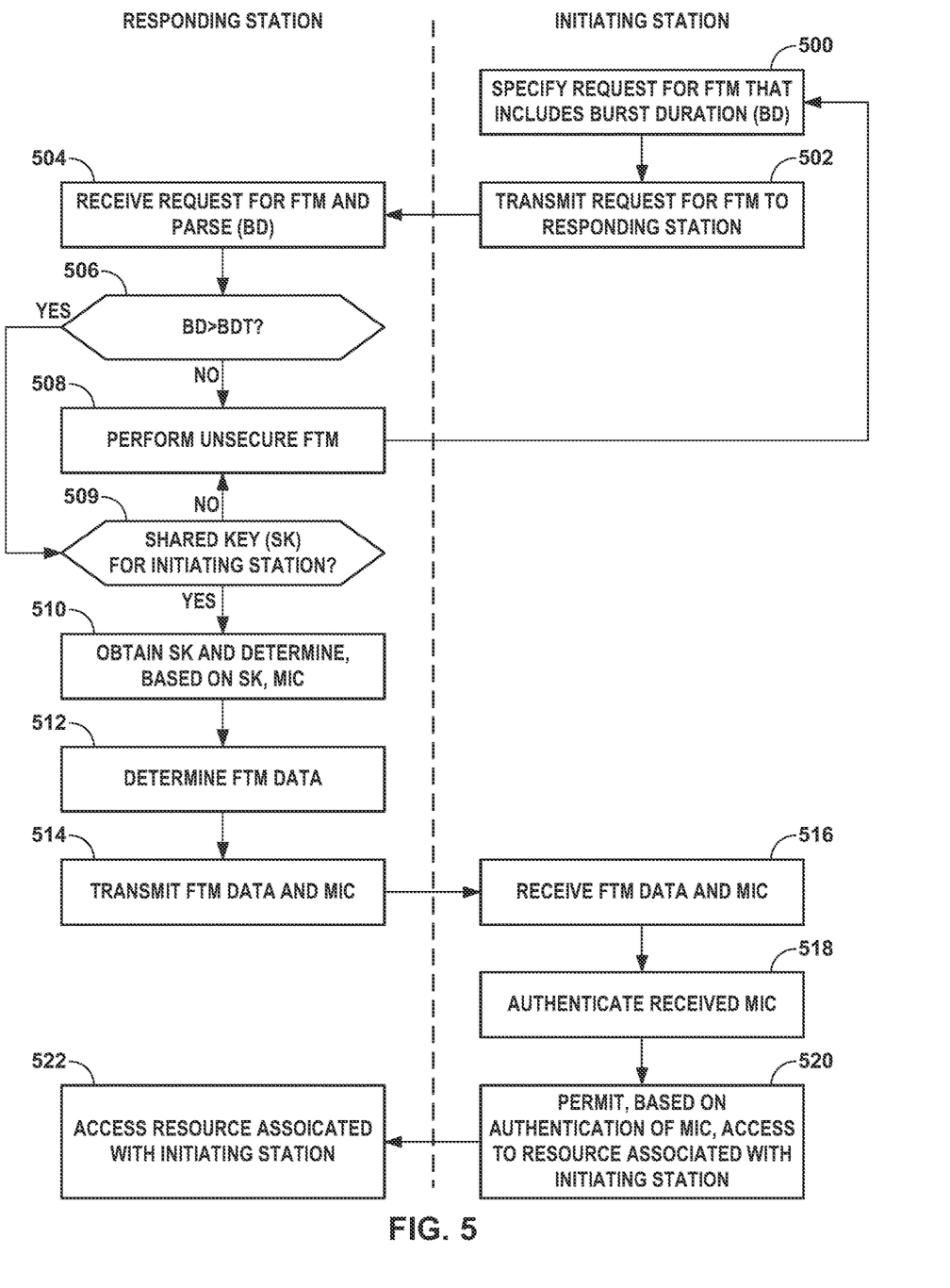
FIG. 5 is a flowchart illustrating example operations or methods of the keyless access system of FIG. 1 in performing various aspects of the secure fine time measurement techniques described in this disclosure.

FIG. 5 is a flowchart illustrating example operations or methods of the keyless access system of FIG. 1 in performing various aspects of the secure fine time measurement techniques described in this disclosure. Initiating station 102 may initially specify, in a first frame of FTM frames 136, a request for RTT FTM that includes a burst duration 205 (FIG. 2) (500). Initiating station 102 may transmit the request for FTM to responding station 104 (502).

Responding station 104 may receive the first frame of FTM frames 136 requesting RTT FTM and parse burst duration 205 from the first frame (504). Responding station 104 may compare burst duration 205 specified in the first frame to the burst duration threshold (BDT) 138 (506) in order to determine whether to perform secure FTM. When parsed burst duration 205 is less than or equal to BDT 138 ("NO" 506), responding device 102 may perform unsecured FTM (508).

When parsed burst duration 205 is greater than BDT 138 ("YES" 506), responding station 104 may determine whether a shared key exists in storage unit 126 for initiating station 102 (or, in other words, whether responding station 104 has been previously associated with initiating station 102) (509). When responding station 104 does not include a shared key in storage unit 126 that corresponds to initiating station 102, responding station 104 may perform unsecured FTM (508). When responding station 104 includes a shared key in storage unit 126 that corresponds to initiating station 102 (e.g., SK 134), responding station 104 may obtain SK 134, and determine, based on SK 134, MIC 132 (510).

Responding station 104 may also determine FTM data 130 (512), which may include a first indication of a fine time measurement specifying a first time (and possibly a second time). Responding station 104 may transmit FTM data 130 to initiating station 102 (514) in this manner for one or more additional iterations. As such, initiating station 102 may receive, in accordance with a wireless networking protocol for communicating between initiating station 102 and responding station 104, FTM data 130 specifying at least a first time (516).

Responding station 104 may also transmit MIC 132. That is, after the iterations of providing FTM frames 136 specifying FTM data 130 has concluded, responding station 104 may generate one or more FTM frames 136 that specify MIC 132 generated using SK 134. Responding station 104 may transmit the FTM frames 136 to initiating station 102. In this manner, responding station 104 may transmit FTM data 130 and MIC 132 to initiating station 102 (514), where initiating station 102 may receive FTM data 130 and MIC 132 (516).

Initiating station 102 may thereby authenticate MIC 132 (518) to establish a secure session between initiating station 102 and responding station 104. To authenticate MIC 132, initiating station 102 may apply SK 134 to some base value (e.g., a time at which WCP unit 128 received the subsequent frame specifying FTM data 130, FTM data 130, etc.) in order to reconstruct a comparison MIC (which is not shown in the example of FIG. 1 for ease of illustration purposes). Initiating station 102 may then compare the comparison MIC to MIC 132 specified in the corresponding frame of FTM frames 136.

When the comparison MIC is different from MIC 132, initiating station 102 may determine that responding station 104 is not a valid or, in other words, authorized responding station and may revoke access to vehicle 102. When the comparison MIC is the same as MIC 132, initiating station 102 may determine that responding station 104 is a valid or, in other words, authorized responding station, and may permit responding station 104 to access initiating station 104. Initiating station 102 may, in other words, permit, based on authentication of the MIC 132, responding station 104 to access initiating station 102 (e.g., to initiate an unlock door, trunk or other compartment, or potentially open a door, trunk, etc) (520). Responding station 104 may then access initiating station 102 (522).

The following clauses may illustrate one or more aspects of the disclosure.

Clause 1A. A method comprising: receiving, in accordance with a wireless networking protocol for communicating between an initiating station and a responding station, a first fine time measurement specifying a first time; receiving, in accordance with the wireless networking protocol and for the corresponding first time, a first message integrity code; and authenticating, based on the first message integrity code, the responding station to establish that the fine time measurement is from a trusted responding station.

Clause 2A. The method of clause 1A, further comprising: specifying, in a first frame that conforms to the wireless networking protocol, an indication that the fine time measurement is to be authenticated via one or more message integrity codes that includes the first message integrity code; and transmitting, via the wireless networking protocol, the first frame to the responding station.

Clause 3A. The method of clause 2A, wherein specifying the indication comprises specifying, in the first frame that conforms to the wireless networking protocol, a burst duration along with a request for performing fine time measurement, wherein the burst duration is above a threshold burst duration to indicate that the responding station is to be authenticated via one or more message integrity codes that includes the first message integrity code.

Clause 4A. The method of any combination of clauses 1A-3A, further comprising: generating a first frame in accordance with the wireless networking protocol that requests fine time measurement; sending, to the responding station, the first frame, wherein receiving the first fine time measurement for the first time comprises receiving a second frame that includes the first fine time measurement specifying the first time, wherein the method further comprises: generating a third frame specifying an acknowledgement to the second frame; and sending, to the responding station, the third frame.

Clause 5A. The method of any combination of clauses 1A-4A, wherein authenticating the responding station comprises: computing, based on a shared key, an authentication message integrity code; comparing the authentication message integrity code to the first message integrity code; and authenticating, based on the comparison of the authentication message integrity code to the first message integrity code, the responding station to establish the secure session between the responding station and the initiating station.

Clause 6A. The method of any combination of clauses 1A-5A, further comprising: receiving, in accordance with the wireless networking protocol, a second fine timing measurement specifying a second time; and receiving, in accordance with the wireless networking protocol and for the corresponding second time, a second message integrity code, wherein authenticating the responding station comprises authenticating, based on the first message integrity code and the second message integrity code, the responding station to establish the secure session between the initiating station and the responding station.

Clause 7A. The method of any combination of clauses 1A-6A, further comprising associating, via a personal area network, the initiating station to the responding station to exchange a shared key by which to generate the first message integrity code.

Clause 8A. The method of any combination of clauses 1A-7A, further comprising: detecting, via the personal area network and prior to enabling communication via the wireless network protocol, the responding station; and enabling, responsive to detecting the responding station via the personal area network, the communication via the wireless network protocol between the initiating station and the responding station.

Clause 9A. The method of any combination of clauses 1A-8A, further comprising: converting, based on successful authentication of the first message integrity code, the fine time measurement into a distance; and permitting, when the distance is less than a threshold distance, the responding station to access a resource associated with the initiating station.

Clause 10A. The method of clause 9A, wherein permitting the responding station to access the initiating station comprises allowing, based on successful authentication of the first message integrity code, the responding station to unlock a lock coupled to the initiating station.

Clause 11A. The method of any combination of clauses 1A-10A, wherein the wireless networking protocol comprises a wireless networking protocol that conforms to an Institute of Electrical and Electronics Engineers (IEEE) 802.11 standard.

Clause 12A. An initiating station comprising: wireless communication circuitry configured to: receive, in accordance with a wireless networking protocol for communicating between the initiating station and a responding station, a first fine time measurement specifying a first time; receive, in accordance with the wireless networking protocol and for the corresponding first time, a first message integrity code; and authenticate, based on the first message integrity code, the responding station to establish that the fine time measurement is from a trusted responding station.

Clause 13A. The initiating station of clause 12A, wherein the wireless communication circuitry is further configured to: specify, in a first frame that conforms to the wireless networking protocol, an indication that the fine time measurement is to be authenticated via one or more message integrity codes that includes the first message integrity code; and transmit, via the wireless networking protocol, the first frame to the responding station.

Clause 14A. The initiating station of clause 13A, wherein the wireless communication circuitry is, when specifying the indication, configured to: specify, in the first frame that conforms to the wireless networking protocol, a burst duration along with a request for performing fine time measurement, wherein the burst duration is above a threshold burst duration to indicate that the responding station is to be authenticated via one or more message integrity codes that includes the first message integrity code.

Clause 15A. The initiating station of any combination of clauses 12A-14A, wherein the wireless communication circuitry is further configured to: generate a first frame in accordance with the wireless networking protocol that requests fine time measurement; transmit, to the responding station, the first frame, wherein the wireless communication circuitry is, when receiving the first fine time measurement for the first time, configured to receive a second frame that includes the first fine time measurement specifying the first time, wherein the wireless communication circuitry is further configured to: generate a third frame specifying an acknowledgement to the second frame; and transmit, to the responding station, the third frame.

Clause 16A. The initiating station of any combination of clauses 12A-15A, wherein the wireless communication circuitry is, when authenticating the responding station, configured to: compute, based on a shared key, an authentication message integrity code; compare the authentication message integrity code to the first message integrity code; and authenticate, based on the comparison of the authentication message integrity code to the first message integrity code, the responding station to establish the secure session between the responding station and the initiating station.

Clause 17A. The initiating station of any combination of clauses 12A-16A, wherein the wireless communication circuitry is further configured to: receive, in accordance with the wireless networking protocol, a second fine timing measurement specifying a second time; and receive, in accordance with the wireless networking protocol and for the corresponding second time, a second message integrity code, wherein the wireless communication circuitry is, when authenticating the responding station, configured to authenticate, based on the first message integrity code and the second message integrity code, the responding station to establish the secure session between the initiating station and the responding station.

Clause 18A. The initiating station of any combination of clauses 12A-17A, wherein the wireless communication circuitry is further configured to associate, via a personal area network, the initiating station to the responding station to exchange a shared key by which to generate the first message integrity code.

Clause 19A. The initiating station of any combination of clauses 12A-18A, wherein the wireless communication circuitry is further configured to: detect, via the personal area network and prior to enabling communication via the wireless network protocol, the responding station; and enable, responsive to detecting the responding station via the personal area network, the communication via the wireless network protocol between the initiating station and the responding station.

Clause 20A. The initiating station of any combination of clauses 12A-19A, wherein the wireless communication circuitry is further configured to: convert, based on successful authentication of the first message integrity code, the fine time measurement into a distance; and permit, when the distance is less than a threshold distance, the responding station to access a resource associated with the initiating station.

Clause 21A. The initiating station of clause 20A, wherein the wireless communication circuitry is, when permitting the responding station to access the initiating station, configured to allow, based on successful authentication of the responding station, the responding station to unlock a lock coupled to the initiating station.

Clause 22A. The initiating station of any combination of clauses 12A-21A, wherein the wireless networking protocol comprises a wireless networking protocol that conforms to an Institute of Electrical and Electronics Engineers (IEEE) 802.11 standard.

Clause 23A. A non-transitory computer-readable storage media storing instructions that, when executed, cause one or more processors to perform each step of the method recited in any combination of clauses 1A-11A.

Clause 1B. A method comprising: transmitting, in accordance with a wireless networking protocol for communicating between an initiating station and a responding station, a first fine time measurement specifying a first time; transmitting, in accordance with the wireless networking protocol and for the corresponding first time, a first message integrity code; and receiving, responsive to the first message integrity code, an acknowledgement indicating that a secure session has been established between the initiating station and the responding station.

Clause 2B. The method of clause 1B, further comprising receiving a first frame in accordance with the wireless networking protocol, the first frame including an indication that fine time measurement is to be authenticated via one or more message integrity codes that includes the first message integrity code.

Clause 3B. The method of clause 2B, wherein the indication comprises a burst duration that is above a threshold burst duration to signal that the fine time measurement is authenticated via one or more message integrity codes that includes the first message integrity code.

Clause 4B. The method of any combination of clauses 1B-3B, further comprising receiving a first frame that conforms to the wireless networking protocol that requests fine time measurement, wherein transmitting the first fine time measurement for the first time comprises transmitting a second frame that includes the first fine time measurement specifying the first time, and wherein the method further comprises receiving a third frame specifying an acknowledgement to the second frame that includes a second time representative of when the second frame was received and a third time representative of when the third frame was sent.

Clause 5B. The method of any combination of clauses 1B-4B, further comprising: transmitting, in accordance with the wireless networking protocol, a second fine timing measurement specifying a second time; and transmitting, in accordance with the wireless networking protocol and for the corresponding second time, a second message integrity code to establish the secure session between the initiating station and the responding station.

Clause 6B. The method of any combination of clauses 1B-5B, further comprising associating, via a personal area network, the initiating station with the responding station to exchange a shared key by which to generate the first message integrity code.

Clause 7B. The method of any combination of clauses 1B-6B, further comprising accessing, based on receipt of the acknowledgement, a resource associated with the initiating station.

Clause 8B. The method of any combination of clauses 1B-7B, further comprising: detecting, via the personal area network and prior to enabling communication via the wireless network protocol, the initiating station; and enabling, responsive to detecting the initiating station via the personal area network, the communication via the wireless network protocol between the initiating station and the responding station.

Clause 9B. A responding station comprising: wireless communication circuitry configured to: transmit, in accordance with a wireless networking protocol for communicating between an initiating station and the responding station, a first fine time measurement specifying a first time; transmit, in accordance with the wireless networking protocol and for the corresponding first time, a first message integrity code; and receive, responsive to the first message integrity code, an acknowledgement indicating that a secure session has been established between the initiating station and the responding station.

Clause 10B. The responding station of clause 9B, wherein the wireless communication circuitry is further configured to receive a first frame in accordance with the wireless networking protocol, the first frame including an indication that fine time measurement is to be authenticated via one or more message integrity codes that includes the first message integrity code.

Clause 11B. The responding station of clause 10B, wherein the indication comprises a burst duration that is above a threshold burst duration to signal that the fine time measurement is authenticated via one or more message integrity codes that includes the first message integrity code.

Clause 12B. The responding station of any combination of clauses 9B-11B, wherein the wireless communication circuitry is further configured to: receive a first frame that conforms to the wireless networking protocol that requests fine time measurement, wherein the wireless communication circuitry is, when transmitting the first fine time measurement for the first time, configured to transmit a second frame that includes the first fine time measurement specifying the first time, and further configured to receive a third frame specifying an acknowledgement to the second frame that includes a second time representative of when the second frame was received and a third time representative of when the third frame was sent.

Clause 13B. The responding station of any combination of clauses 9B-12B, further configured to: transmit, in accordance with the wireless networking protocol, a second fine timing measurement specifying a second time; and transmit, in accordance with the wireless networking protocol and for the corresponding second time, a second message integrity code to establish the secure session between the initiating station and the responding station.

Clause 14B. The responding station of any combination of clauses 9B-13B, further configured to associate, via a personal area network, the initiating station with the responding station to exchange a shared key by which to generate the first message integrity code.

Clause 15B. The responding station of any combination of clauses 9B-14B, further comprising processing circuitry configured to access, based on receipt of the acknowledgement, a resource associated with the initiating station.

Clause 16B. The responding station of any combination of clauses 9B-15B, further configured to: detect, via the personal area network and prior to enabling communication via the wireless network protocol, the initiating station; and enable, responsive to detecting the initiating station via the personal area network, the communication via the wireless network protocol between the initiating station and the responding station.

Clause 17B. A non-transitory computer-readable storage media storing instructions that, when executed, cause one or more processors to perform each step of the method recited in any combination of clauses 1B-8B.

1C. A system comprising: an initiating station; and a responding station, the responding station comprising: first wireless communication circuitry configured to: transmit, in accordance with a wireless networking protocol for communicating between the initiating station and the responding station, a first fine time measurement specifying a first time; transmit, in accordance with the wireless networking protocol and for the corresponding first time, a first message integrity code; wherein the initiating station comprises: second wireless communication circuitry configured to: receive, in accordance with a wireless networking protocol for communicating between the initiating station and a responding station, the first fine time measurement specifying the first time; receive, in accordance with the wireless networking protocol and for the corresponding first time, the first message integrity code; authenticate, based on the first message integrity code, the responding station to establish a secure session between the initiating station and the responding station; and transmit, in accordance with the wireless networking protocol, an acknowledgement indicating that a secure session has been established between the initiating station and the responding station, wherein the responding station further comprises processing circuitry configured to access, based on receipt of the acknowledgment, a resource associated with the initiating station.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fibre optic cable, twisted pair, digital subscriber line (DSL), or wireless technologies such as infrared, radio, and microwave, then the coaxial cable, fibre optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A system comprising:
an initiating station; and
a responding station, the responding station comprising:
first wireless communication circuitry configured to:
transmit, in accordance with a wireless networking protocol for communicating between the initiating station and the responding station, a first time of departure and a first fine time measurement specifying a first time, the first time of departure indicating when the first fine time measurement was sent;
transmit, in accordance with the wireless networking protocol, for the corresponding first time, and after transmitting the first fine time measurement specifying the first time, a second time of departure along with a first message integrity code, the second time of departure being the same as the first time of departure to indicate that the first fine time measurement corresponds to the first message integrity code;
wherein the initiating station comprises:
second wireless communication circuitry configured to:
receive, in accordance with a wireless networking protocol for communicating between the initiating station and a responding station, the first time of departure and the first fine time measurement specifying the first time;
receive, in accordance with the wireless networking protocol, for the corresponding first time, and after receiving the first fine time measurement specifying the first time, the first time of departure and the first message integrity code;
authenticate, in response to determining that the first time of departure is the same between the first fine time measurement and the first message integrity code and based on the first message integrity code, the responding station to establish a secure session between the initiating station and the responding station; and
transmit, in accordance with the wireless networking protocol, an acknowledgement indicating that a secure session has been established between the initiating station and the responding station,
wherein the responding station further comprises processing circuitry configured to access, based on receipt of the acknowledgment, a resource associated with the initiating station.

2. A method comprising:
receiving, in accordance with a wireless networking protocol for communicating between an initiating station and a responding station, a first time of departure and a first fine time measurement specifying a first time, the first time of departure indicating when the first fine time measurement was sent;
receiving, in accordance with the wireless networking protocol and for the corresponding first time and after receiving the first fine time measurement specifying the first time, a second time of departure along with a first message integrity code, the second time of departure being the same as the first time of departure to indicate that the first fine time measurement corresponds to the first message integrity code; and
authenticating, in response to determining that the first time of departure is the same between the first fine time measurement and the first message integrity code and based on the first message integrity code, the responding station to establish that the fine time measurement is from a trusted responding station.

3. The method of claim 2, further comprising:
specifying, in a first frame that conforms to the wireless networking protocol, an indication that the fine time measurement is to be authenticated via one or more message integrity codes that includes the first message integrity code; and
transmitting, via the wireless networking protocol, the first frame to the responding station.

4. The method of claim 3, wherein specifying the indication comprises specifying, in the first frame that conforms to the wireless networking protocol, a burst duration along with a request for performing fine time measurement, wherein the burst duration is above a threshold burst duration to indicate that the responding station is to be authenticated via the one or more message integrity codes that includes the first message integrity code.

5. The method of claim 2, further comprising:
generating a first frame in accordance with the wireless networking protocol that requests fine time measurement;
sending, to the responding station, the first frame,
wherein receiving the first fine time measurement for the first time comprises receiving a second frame that includes the first fine time measurement specifying the first time,
wherein the method further comprises:

generating a third frame specifying an acknowledgement to the second frame; and sending, to the responding station, the third frame.

6. The method of claim 2, wherein authenticating the responding station comprises:

computing, based on a shared key, an authentication message integrity code;

comparing the authentication message integrity code to the first message integrity code; and authenticating, based on the comparison of the authentication message integrity code to the first message integrity code, the responding station to establish the secure session between the responding station and the initiating station.

7. The method of claim 2, further comprising:

receiving, in accordance with the wireless networking protocol, a second fine timing measurement specifying a second time; and receiving, in accordance with the wireless networking protocol and for the corresponding second time, a second message integrity code, wherein authenticating the responding station comprises authenticating, based on the first message integrity code and the second message integrity code, the responding station to establish the secure session between the initiating station and the responding station.

8. The method of claim 2, further comprising associating, via a personal area network, the initiating station to the responding station to exchange a shared key by which to generate the first message integrity code.

9. The method of claim 2, further comprising:

detecting, via the personal area network and prior to enabling communication via the wireless network protocol, the responding station; and enabling, responsive to detecting the responding station via the personal area network, the communication via the wireless network protocol between the initiating station and the responding station.

10. The method of claim 2, further comprising:

converting, based on successful authentication of the responding station, the fine time measurement into a distance; and permitting, when the distance is less than a threshold distance, the responding station to access a resource associated with the initiating station.

11. The method of claim 10, wherein permitting the responding station to access the initiating station comprises allowing, based on successful authentication of the responding station, the responding station to unlock a lock coupled to the initiating station.

12. The method of claim 2, wherein the wireless networking protocol comprises a wireless networking protocol that conforms to an Institute of Electrical and Electronics Engineers (IEEE) 802.11 standard.

13. A method comprising:

transmitting, in accordance with a wireless networking protocol for communicating between an initiating station and a responding station, a first time of departure and a first fine time measurement specifying a first time, the first time of departure indicating when the first fine time measurement was sent;

transmitting, in accordance with the wireless networking protocol and for the corresponding first time and after transmitting the first fine time measurement specifying the first time, a second time of departure along with a first message integrity code, the second time of departure being the same as the first time of departure to indicate that the first fine time measurement corresponds to the first message integrity code; and receiving, responsive to the first message integrity code, an acknowledgement indicating that a secure session has been established between the initiating station and the responding station.

14. The method of claim 13, further comprising receiving a first frame in accordance with the wireless networking protocol, the first frame including an indication that fine time measurement is to be authenticated via one or more message integrity codes that includes the first message integrity code.

15. The method of claim 14, wherein the indication comprises a burst duration that is above a threshold burst duration to signal that the fine time measurement is authenticated via the one or more message integrity codes that includes the first message integrity code.

16. The method of claim 13, further comprising receiving a first frame that conforms to the wireless networking protocol that requests fine time measurement, wherein transmitting the first fine time measurement for the first time comprises transmitting a second frame that includes the first fine time measurement specifying the first time, and wherein the method further comprises receiving a third frame specifying an acknowledgement to the second frame that includes a second time representative of when the second frame was received and a third time representative of when the third frame was sent.

17. The method of claim 13, further comprising:

transmitting, in accordance with the wireless networking protocol, a second fine timing measurement specifying a second time; and transmitting, in accordance with the wireless networking protocol and for the corresponding second time, a second message integrity code to establish the secure session between the initiating station and the responding station.

18. The method of claim 13, further comprising associating, via a personal area network, the initiating station with the responding station to exchange a shared key by which to generate the first message integrity code.

19. The method of claim 13, further comprising accessing, based on receipt of the acknowledgement, a resource associated with the initiating station.

20. The method of claim 13, further comprising:

detecting, via the personal area network and prior to enabling communication via the wireless network protocol, the initiating station; and enabling, responsive to detecting the initiating station via the personal area network, the communication via the wireless network protocol between the initiating station and the responding station.

* * * * *